(12) United States Patent
Cheung

(10) Patent No.: US 10,967,606 B2
(45) Date of Patent: Apr. 6, 2021

(54) FOAM PRODUCT

(71) Applicant: Loi Hui Cheung, New Territories (HK)

(72) Inventor: Loi Hui Cheung, New Territories (HK)

(*) Notice: Subject to any disclaimer, the term of this patent is extended or adjusted under 35 U.S.C. 154(b) by 370 days.

(21) Appl. No.: 16/205,195

(22) Filed: Nov. 29, 2018

(65) Prior Publication Data

US 2020/0171785 A1 Jun. 4, 2020

(51) Int. Cl.
*B32B 5/18* (2006.01)
*B32B 7/12* (2006.01)
*B32B 5/32* (2006.01)

(52) U.S. Cl.
CPC ............ *B32B 5/18* (2013.01); *B32B 5/32* (2013.01); *B32B 7/12* (2013.01); *B32B 2255/102* (2013.01); *B32B 2255/26* (2013.01); *B32B 2305/022* (2013.01)

(58) Field of Classification Search
CPC .... B32B 5/18; B32B 5/32; B32B 7/12; B32B 2255/102; B32B 2255/26; B32B 2305/022
See application file for complete search history.

(56) References Cited

U.S. PATENT DOCUMENTS 7,416,461 B2   8/2008   Yeh

FOREIGN PATENT DOCUMENTS

TW   I383882 B   2/2013

*Primary Examiner* — Lucas A Stelling
*Assistant Examiner* — Sathavaram I Reddy
(74) *Attorney, Agent, or Firm* — Cheng-Ju Chiang

(57) ABSTRACT

The foam product includes a foam core, a first outer layer, and a first binding layer. The foam core has a top surface and a bottom surface. The first outer layer is disposed on the top surface and has an outer surface with a visible pattern. The first binding layer is disposed between the first outer layer and the top surface of the foam core for firmly binding the first outer layer, the binding layer, and the foam core together as an integral structure. The binding layer consists of: 10 to 40 wt % of anhydride modified ethylene acrylate resin; 3 to 10 wt % of butane; 0.05 to 0.2 wt % of foaming agent; 0.05 to 3.0 wt % of stabilizer; and remaining part of low density polyethylene (LDPE) resin. So, the entire structure is simple. In addition, it can improve the adhering effect and the safety.

7 Claims, 5 Drawing Sheets

FOAM PRODUCT

BACKGROUND OF THE INVENTION

1. Field of Invention

The present invention relates to a foam product. The entire structure of this invention is simple. In addition, it can improve the adhering effect and the safety.

2. Description of the Prior Art

With reference to FIG. 8, it is a traditional foam product (such as the U.S. Pat. No. 7,416,461) that can be used in sport goods, e.g. a snowboard, surfboard or the like.

The traditional foam product includes a foam core 91, at least one skin 92, a first plastic covering 93, and a first binding film 94.

The foam core 91 has a top surface 911, a bottom surface 912 and edges 913. The foam core 91 is composed of a plurality of foam beads bonded with another tightly. The top surface 911 has at least one recessed portion 91A.

About the skin 92, it is filled in and bonded with the recessed portion 91A of the foam core 91.

The first plastic covering 93 is fully bonded to the top surface 911, the edges 113 and the skin 92. Also, the first plastic covering 93 comprises one or more visible patterns 931.

The first binding film 94 is provided for binding first plastic covering 93 on the top surface 911 of the foam core 91, the edges 913, and the skin 92.

However, the traditional foam product has the following disadvantages.

[1] The entire structure is relatively complicated. About the traditional foam product, a skin is required for dispersing the external force applied on. In addition, the recess is required so as to allow the skin to be installed. Therefore, the function of the skin is to disperse the external force and to avoid the deformation. However, such design makes the entire structure relatively complicated.

[2] The adhering effect is poor. The first binding film is required to be disposed between the skin and the first plastic covering. The first binding film must be a material that can adhere with the foam structure, such as copolymer or glue. However, no matter copolymer or glue is utilized, the adhering effect is poor. So, it is relatively easy to be separated due to a large external force or impact. Particularly, it is dangerous for a snowboard or surfboard user.

SUMMARY OF THE INVENTION

The object of this invention is to provide a foam product with the advantages of simple structure, excellent adhering effect and higher safety. Especially, it can solve the problems of the traditional foam product, such as the entire structure being relatively complicated and the adhering effect being poor.

According to the present invention, a foam product comprising:

a foam core having a top surface and a bottom surface opposite to the top surface; the foam core being composed of a plurality of foam beads;

a first outer layer having a visible pattern; and a first binding layer being disposed between the first outer layer and the top surface of the foam core for firmly binding the first outer layer, the first binding layer, and the foam core together as an integral structure;

wherein the binding layer consisting of:

(a) 10 to 40 wt % of anhydride modified ethylene acrylate resin;

(b) 3 to 10 wt % of butane;

(c) 0.05 to 0.2 wt % of foaming agent;

(d) 0.05 to 3.0 wt % of stabilizer; and (e) remaining part of low density polyethylene (LDPE) resin.

DESCRIPTION OF THE PREFERRED EMBODIMENT

Figure 1:
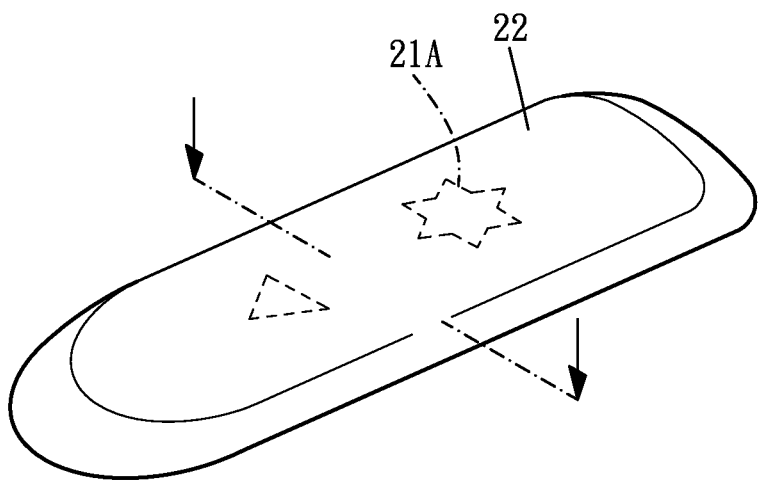
FIG. 1 is a perspective view of the present invention.
Figure 2:
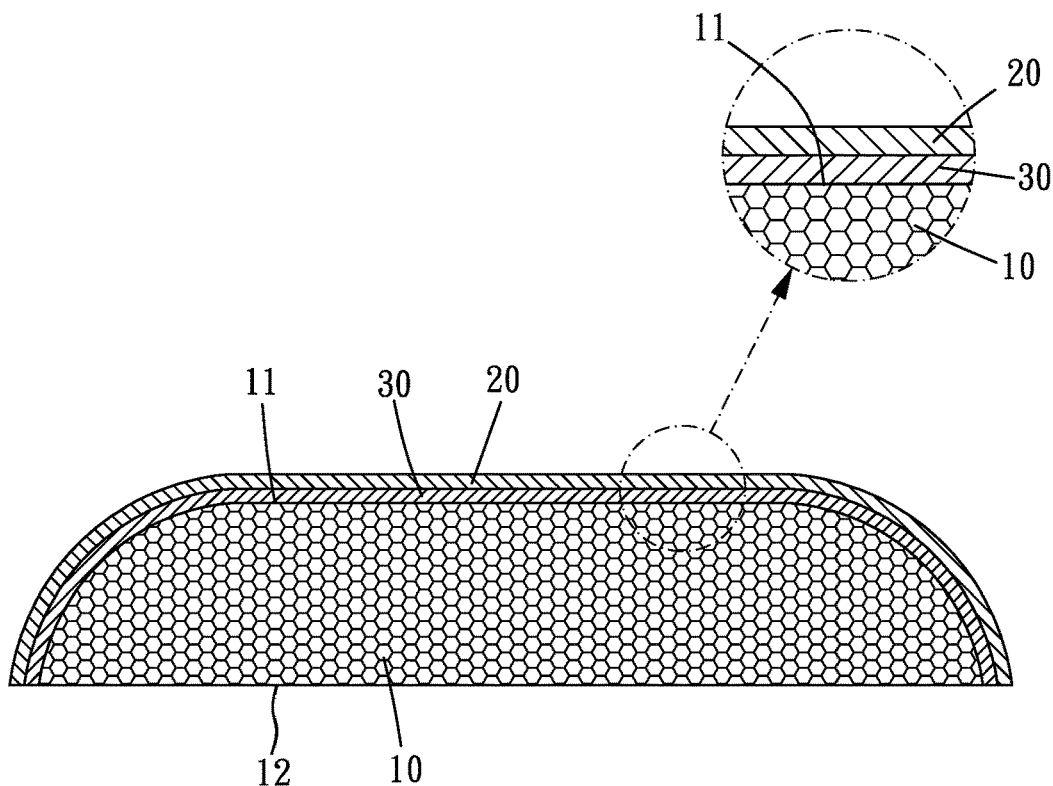
FIG. 2 is a cross-sectional view showing the first preferred embodiment.

Referring to FIGS. 1 and 2, it is the first preferred embodiment of this invention. In which, a foam product comprises a foam core 10, a first outer layer 20, and a first binding layer 30.

With regard to the foam core 10, it has a top surface 11 and a bottom surface 12 that is opposite to the top surface 11. The foam core 10 is composed of a plurality of foam beads.

The first outer layer 20 is disposed on (or above) the top surface 11. The first outer layer 20 has a visible pattern 21A (which is printed, coated or the like).

The first binding layer 30 is disposed between the first outer layer 20 and the top surface 11 of the foam core 10 for firmly binding the first outer layer 20, the binding layer 30, and the foam core 10 together as an integral structure.

Furthermore, the binding layer 30 consists of:

(a) 10 to 40 wt % of anhydride modified ethylene acrylate resin;

(b) 3 to 10 wt % of butane;

(c) 0.05 to 0.2 wt % of foaming agent;

(d) 0.05 to 3.0 wt % of stabilizer (such as monoglyceride); and (e) remaining part of low density polyethylene (LDPE) resin.

Practically, the anhydride modified ethylene acrylate resin can be the product of the DuPont Bynel series 2100 (such as Bynel 21E533) or other equivalent product.

The first outer layer 20 can be a single layer structure (referring to the first preferred embodiment in FIG. 2) or multiple layer structure.

Figure 3:
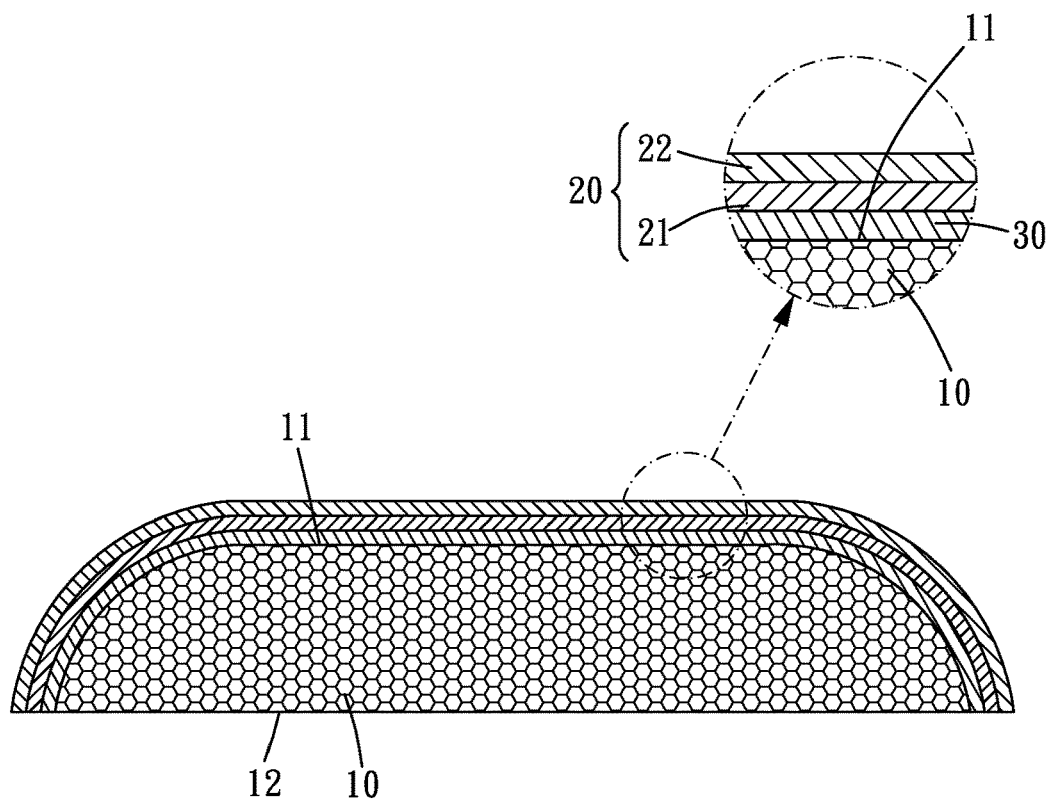
FIG. 3 is a cross-sectional view showing the second preferred embodiment.

When it is the multiple layer structure (referring to FIG. 3, the second preferred embodiment), the first outer layer 20 includes:

a first foam layer 21 which can be polyethylene (PE), Polypropylene (PP) or the like; the first foam layer 21 has a density in the range of 1.5 to 15 PCF; and a thermal transfer film 22 that is disposed on the first foam layer 21; and the visible pattern 21A is formed on the thermal transfer film 22.

Figure 4:
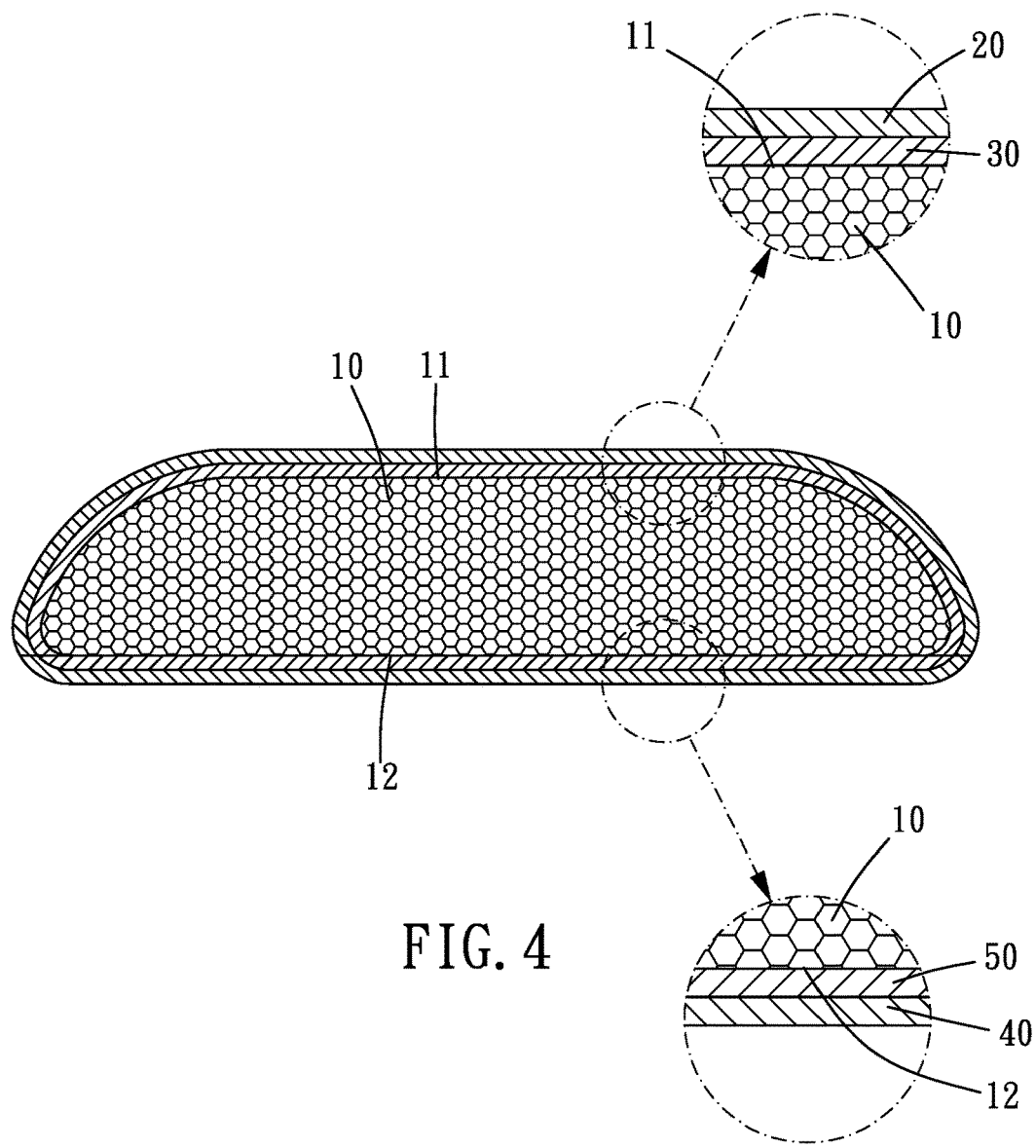
FIG. 4 is a cross-sectional view showing the third preferred embodiment.
Figure 5:
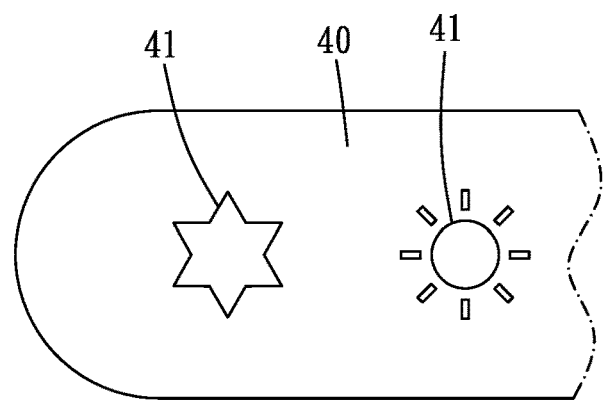
FIG. 5 is a bottom view of a portion of this invention.

Referring to FIGS. 4 and 5, the foam product can further comprise a second outer layer 40 and a second binding layer 50. FIG. 4 shows the third preferred embodiment of this invention.

The second outer layer 40 has another visible pattern 41 (see FIG. 5).

The second binding layer 50 is disposed between the second outer layer 40 and the bottom surface 12 of the foam core 10 for firmly binding the second outer layer 40, the second binding layer 50, and the foam core 10 together as an integral structure.

The material of the second binding layer 50 is as same as the one of the first binding layer 20.

The second binding layer 50 consists of:
(a) 10 to 40 wt % of anhydride modified ethylene acrylate resin;
(b) 3 to 10 wt % of butane;
(c) 0.05 to 0.2 wt % of foaming agent;
(d) 0.05 to 3.0 wt % of stabilizer; and
(e) remaining part of low density polyethylene (LDPE) resin.

Figure 6:
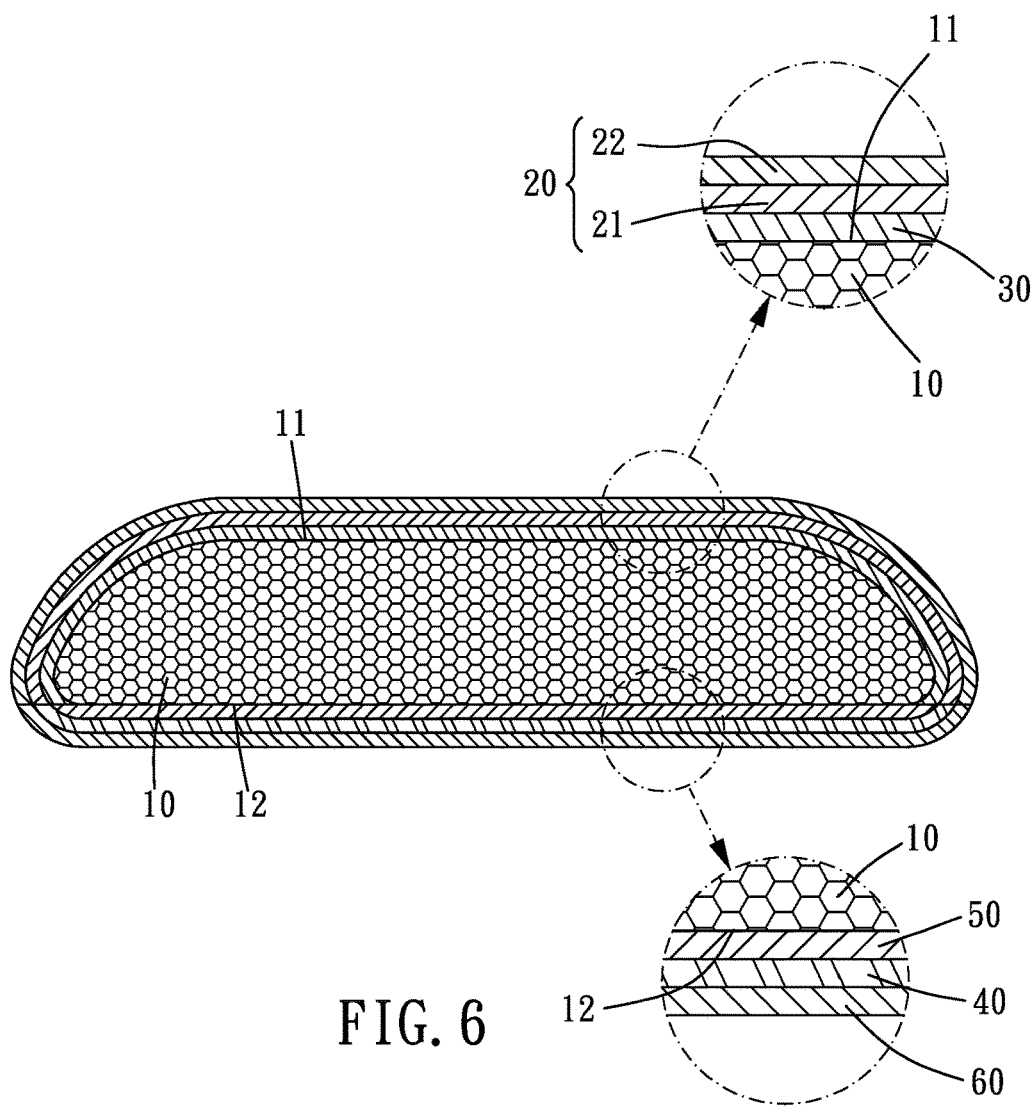
FIG. 6 is a cross-sectional view showing the fourth preferred embodiment.

Of course, the foam product can further comprise a protective film 60 (referring to FIG. 6 which is the fourth preferred embodiment) that is coated on the second outer layer 40. The protective film 60 can be made by a transparent high density polyethylene (LDPE) resin.

Figure 7:
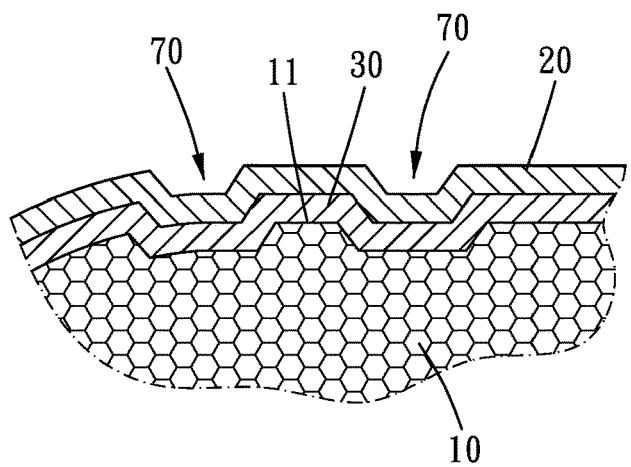
FIG. 7 is a cross-sectional view showing the fifth preferred embodiment.
Figure 8:
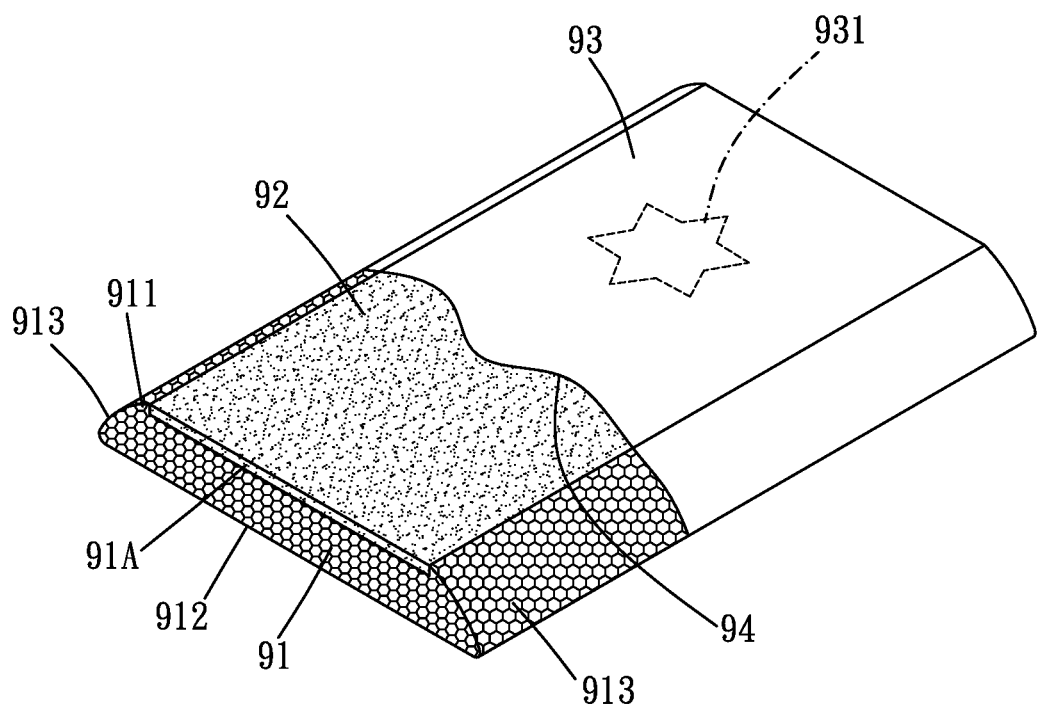
FIG. 8 is a view showing the traditional foam product.

In addition, it is optional that the top surface 11 of the foam core 10 has a plurality of recesses, as shown in FIG. 7 (the fifth preferred embodiment). It can enhance the friction while the user is standing on the foam product as well as improve the structural strength of the layer(s) secured on the foam core 10.

After the foam product being tested, the first binding layer 30 has a good adhering ability. Not only first binding layer 30 is firmly adheres with the foam core 10, but also the first binding layer 30 firmly adheres with the first outer layer 20. Similarly, the second binding layer 50 has the same result.

Therefore, it needs an extremely large force to separate the first outer layer 20 (or the second outer layer 40) from the foam core 10. The binding result of this invention is much better than the traditional product.

So, the advantages and function of this invention can be summarized as follows.

[1] The entire structure is simple. Because the first binding layer has an excellent adhering effect, there is no need to use glue nor a binding film mentioned in the traditional product. Thus, this invention can simplify the entire structure.

[2] It can improve the adhering effect and the safety. In this invention, the first binding layer and the second binding layer have an excellent adhering effect. It is not easy to be separated due to an external impact. Particularly, if the foam product is used as a snow board or a surf board (it is required to endure high external impact), the safety for this user will be increased. Hence, once the adhering effect is raised, the safety of the product can be increased without doubt.

The above embodiments are only used to illustrate the present invention, not intended to limit the scope thereof. Many modifications of the above embodiments can be made without departing from the claims of the present invention.

What is claimed is:

1. A foam product comprising:
    a foam core having a top surface and a bottom surface opposite to said top surface; said foam core being composed of a plurality of foam beads;
    a first outer layer having a visible pattern; and
    a first binding layer being disposed between said first outer layer and said top surface of said foam core for firmly binding said first outer layer, said first binding layer, and said foam core together as an integral structure;
    wherein said first binding layer consisting of:
        (a) 10 to 40 wt % of anhydride modified ethylene acrylate resin;
        (b) 3 to 10 wt % of butane;
        (c) 0.05 to 0.2 wt % of foaming agent;
        (d) 0.05 to 3.0 wt % of stabilizer; and
        (e) remaining part of low density polyethylene (LDPE) resin.

2. The foam product as defined in claim 1, wherein said first outer layer is selected from the group consisting of a single layer structure and a multi-layer structure.

3. The foam product as defined in claim 2, wherein said first outer layer is a multi-layer structure, said first outer layer comprising:
    a first foam layer being selected from the group consisting of polyethylene (PE) and Polypropylene (PP); and
    a thermal transfer film disposed on said first foam layer, said visible pattern being formed on said thermal transfer film.

4. The foam product as defined in claim 3, wherein said first foam layer having a density in the range of 1.5 to 15 PCF.

5. The foam product as defined in claim 2, further comprising:
    a second outer layer having a visible pattern;
    a second binding layer being disposed between said second outer layer and said bottom surface of said foam core for firmly binding said second outer layer, said second binding layer, and said foam core together as an integral structure;
    wherein said second binding layer consisting of:
        (a) 10 to 40 wt % of anhydride modified ethylene acrylate resin;
        (b) 3 to 10 wt % of butane;
        (c) 0.05 to 0.2 wt % of foaming agent;
        (d) 0.05 to 3.0 wt % of stabilizer; and
        (e) remaining part of low density polyethylene (LDPE) resin.

6. The foam product as defined in claim 5, further comprising:
    a protective film coated on said second outer layer and being a transparent high density polyethylene (LDPE) resin.

7. The foam product as defined in claim 2, wherein said top surface of said foam core having a plurality of recesses.

* * * * *